(12) United States Patent
Reicherts et al.

(10) Patent No.: US 6,410,118 B1
(45) Date of Patent: *Jun. 25, 2002

(54) WATER DURABLE BOARD FOR EXTERIOR WALL ASSEMBLY WATER MANAGEMENT SYSTEM

(75) Inventors: James Reicherts, Cary; Timothy Tonyan, Wheaton; John Lankford, Lindenhurst; Timothy Kenny, Libertyville, all of IL (US)

(73) Assignee: USG Interiors, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,025

(22) Filed: Nov. 14, 1997

(51) Int. Cl.[7] .............................. B32B 3/10; B32B 3/00; D06N 7/04; E04B 1/70

(52) U.S. Cl. ........................ 428/141; 428/156; 428/167; 52/169.5; 52/302.1

(58) Field of Search ................................ 428/141, 156, 428/167, 172, 178; 52/169.5, 169.14, 302.1, 474, 483.1

(56) References Cited

U.S. PATENT DOCUMENTS

| | | | |
|---|---|---|---|
| 3,824,147 A | 7/1974 | Baird ........................... 52/578 |
| 4,350,736 A | 9/1982 | Reily .......................... 428/341 |
| 4,467,580 A | * 8/1984 | Sowinski ..................... 52/302 |
| 4,621,470 A | 11/1986 | Balinski ....................... 52/241 |
| 4,647,496 A | * 3/1987 | Lehnert et al. ............. 428/251 |
| 4,840,515 A | * 6/1989 | Freese .......................... 405/45 |
| 5,198,052 A | 3/1993 | Ali .............................. 156/45 |
| 5,218,793 A | * 6/1993 | Ball .............................. 52/62 |
| 5,397,631 A | * 3/1995 | Green et al. ................ 428/219 |
| 5,425,207 A | 6/1995 | Shayman ..................... 52/79.9 |
| 5,552,187 A | 9/1996 | Green et al. ............. 427/389.8 |
| 5,598,673 A | 2/1997 | Atkins ....................... 52/302.1 |
| 5,826,388 A | * 10/1998 | Irving ....................... 52/302.1 |

OTHER PUBLICATIONS

USG Corp. publication *Exterior Systems* three page article titled "Taking the doubt out of EIFS wall performance" by Ted Kellam, 1997.

* cited by examiner

*Primary Examiner*—Harold Pyon
*Assistant Examiner*—Michael C. Miggins
(74) *Attorney, Agent, or Firm*—Lee, Mann, Smith, McWilliams, Sweeney & Ohlson; John Lorenzen; Janci Lorenzen

(57) ABSTRACT

An exterior wall assembly water management system that provides the designer and building owner with the popular esthetics of synthetic stucco and the long-term reliability of water management. The water managed exterior system includes flashing, a weather-resistive barrier, a water durable board, a basecoat and an exterior finish. Either the water durable board, or an insulation layer secured to the water durable board, forms the exterior cladding of the building structure, and the basecoat and the exterior stucco finish are applied to the outer surface of the water durable board, or in the alternative to the insulation layer. The disclosed water managed exterior system efficiently directs any penetrating water to weeps, or the like, by providing a water drainage medium between the weather-resistive barrier and the water durable board. The unwanted water drains downwards via the drainage medium, is caught at the base of the wall by the flashing, and is further drained outside of the wall cladding.

27 Claims, 4 Drawing Sheets

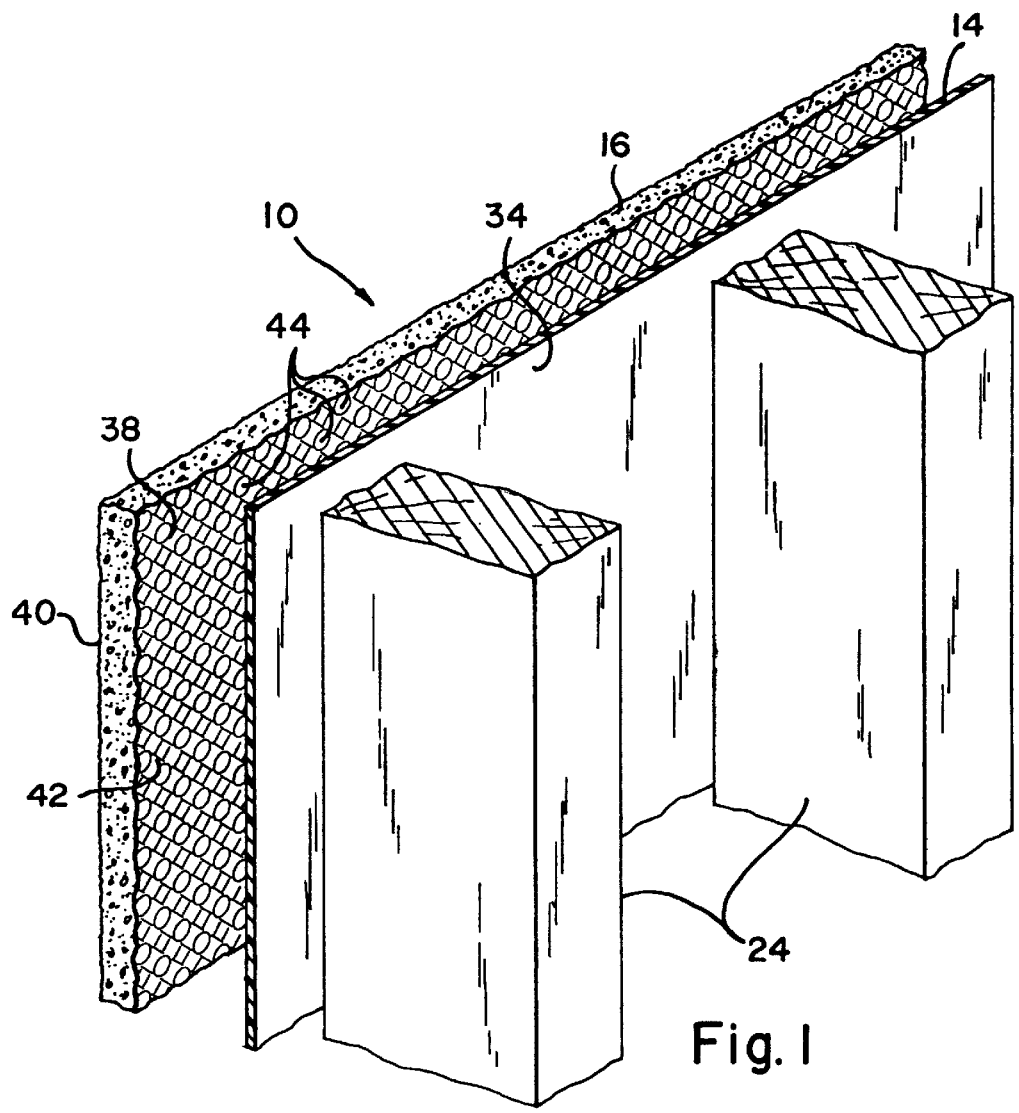
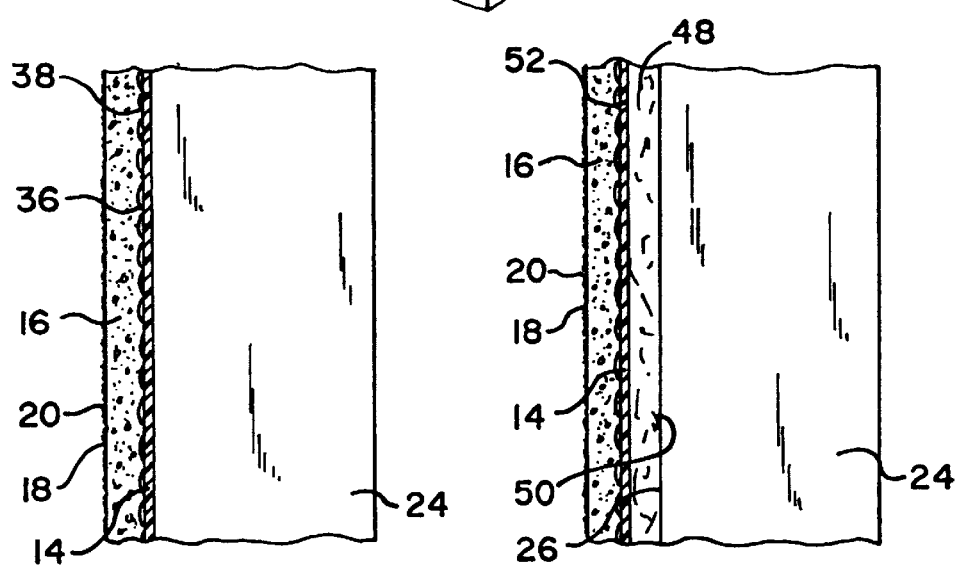
Fig. 1
Fig. 2
Fig. 3

WATER DURABLE BOARD FOR EXTERIOR WALL ASSEMBLY WATER MANAGEMENT SYSTEM

BACKGROUND OF THE INVENTION

This invention relates to improvements in exterior stucco-look finishing systems such as, for example, exterior insulation and finish systems (EIFS) and direct-applied exterior finish systems (DEFS) for buildings. Such EIFS systems are fully described in U.S. Pat. No. 4,647,496. More particularly, this invention relates to an improvement in the management of water as a line of defense by harmlessly handling any unwanted water that has penetrated behind the exterior cladding.

Originally, EIFS was an exterior wall concept designed to have high insulation values and a reliable stucco finish that could be economically created in a wide array of textures and colors. It immediately became successful because it provided so much performance for so little cost. The most unusual aspect of the system was that expanded polystyrene (EPS) insulation was installed on the exterior side of the wall by adhesively binding it to a substrate, forming a base for an exterior coating as well as adding more insulation to the building. The surface typically has a ⅛-inch-thick synthetic-stucco finish system which performs two functions. It is designed to (1) provide a face-seal or barrier to seal out moisture and (2) provide a decorative finish at the same time. This ⅛-inch-thick finish system consists of reinforcing mesh, latex-fortified basecoat, and an aggregated, polymeric, textured finish.

The principal weaknesses in the prior art EIFS is that they have only one line of defense against water intrusion and no means to drain intruding water. Although the surface usually forms an effective water barrier, intersections of the surface with other elements, such as window frames, door frames, etc., often leave gaps or openings that driving rain can penetrate. Once inside the sealed wall and behind the cladding, the water can remain trapped long enough before evaporating to damage or rot any water-sensitive elements, to which the insulation is bonded including, oriented-strand board, plywood, or gypsum sheathing.

Whether the prior art exterior wall systems provide an insulation layer attached to the exterior sheathing which is coated with a stucco-look finish (EIFS), or the stucco-look finish is applied directly over the sheathing (DEFS), there has been no provision for water managed relief at the back side of the sheathing.

As a result of these problems, a need has arisen for water-managed stucco-look systems. The present invention discloses exterior wall systems that provide the designer and building owner with the popular esthetics of synthetic stucco and the long-term reliability of water management.

Prior art building systems have sought to effectively achieve water management. In fact, many common exterior claddings can be considered water managed. Brick veneer, for instance, is typically detailed with a cavity between the face brick and a protected wall framing. This cavity creates a drainage plane, and with weeps at the foundation, it allows water that has penetrated the brick to be removed to the outside.

SUMMARY OF THE INVENTION

The disclosed water managed exterior system efficiently directs the penetrating water to weeps or the like. Should water flank the synthetic stucco cladding, or enter openings for penetrations, it will be stopped at the weather-resistive barrier, then drained to flashing elements, and removed to the outside through the weeps, thereby protecting the stud cavity and any water sensitive materials in the wall cavity from damage.

In a preferred embodiment, the system utilizes a water durable board, such as the DUROCK® Cement Board, as a substrate for insulation, basecoat and finish materials. The interior side of the water durable board is textured to form a water managed plane that allows any water that penetrates to collect along the textures and drain down the interstitial spaces created by the textures. In a more preferred embodiment, the textured plane is a dimple pattern or grooves on the interior surface of the water durable board. The dimple pattern or grooves create a myriad of vertical sinuous flow paths for the water to drain downwards.

The system can be installed over wood- or steel-stud framing; a structural sheathing may be used, depending on the design criteria. Flashing components are installed, along with a weather-resistive barrier, such as a standard No. 15 felt. Wrapping this barrier into openings protects window and door penetrations. Following the application of the water durable board, foam insulation is bonded to the board and then a layer of reinforced basecoat is applied to the entire surface and allowed to dry. In DEFS applications no insulation is applied and the basecoat is applied directly to the durable board surface. To complete the wall, a pre-colored finish such as USG EXTERIOR Textured Finish, is trowel-applied and floated to the desired look.

BRIEF DESCRIPTION OF THE DRAWINGS

FIG. 1 is a perspective view of the water-management system at an exterior building wall assembly for a DEFS;

FIG. 2 is a side view of the water-management system of FIG. 1 showing a wall frame member, weather-resistive barrier and an exterior cladding water durable board thereover;

FIG. 3 is a side view of a second embodiment of the water-management system with a structural sheathing attached between wall framing members and a weather-resistive barrier;

FIG. 6 is a perspective view of the bottom of a cladded wall as in FIG. 1 incorporating the exterior wall assembly water-management system showing the managed drainage of water outwardly at lower flashing at weeps there through;

FIG. 8 is a perspective view of the bottom of the cladded wall of FIG. 7 incorporating the exterior wall assembly water-management system showing the managed drainage of water outwardly at lower flashing at weeps there through.

DETAILED DESCRIPTION OF THE PREFERRED EMBODIMENT

Figure 4:
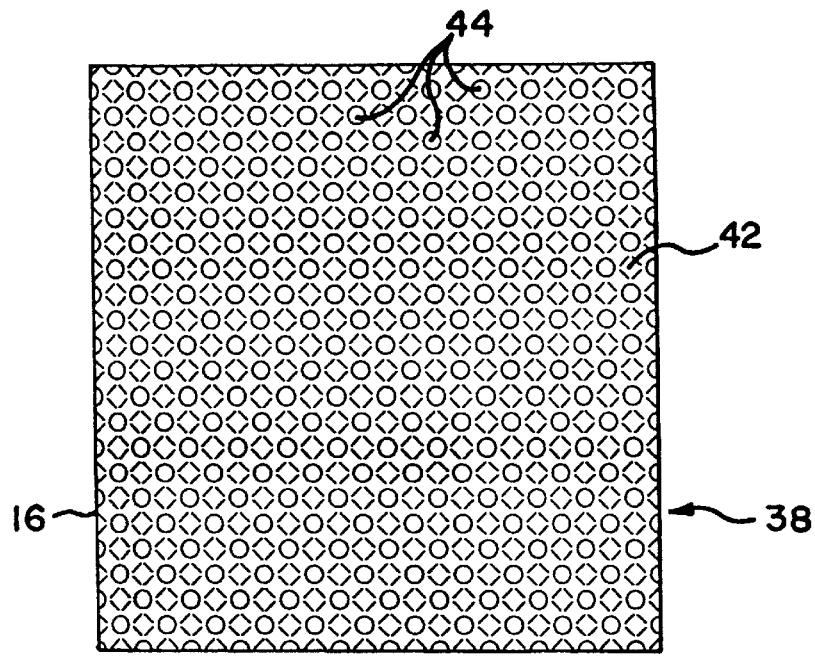
FIG. 4 is an elevational view of the textured pattern created on the inner surface of the water durable board of FIGS. 2 and 3.

The present invention is directed to a DEFS (FIGS. 1–6) or EIFS (FIGS. 7–8) that is adapted to effectively manage the intrusion of water into the system. As shown in FIGS. 1 and 6, the system, generally designated at reference numeral 10, includes flashing 12, a weather-resistive barrier 14, a water durable board 16, such as a DUROCK® Cement Board, a basecoat/adhesive 18, and a stucco-like exterior finish 20. The water durable board 16 thereby is the exterior cladding of the building structure. As will be described in reference to FIGS. 7 and 8, an insulation layer may be attached directly over the water durable board 16 and the basecoat/adhesive 18 and stucco-like finish 20 applied over the insulation. The water managed exterior system 10 is designed to be affixed to a plurality of wall framing studs 24 or other support members.

The wall framing studs 24 have an outer surface 26, and are framed on a base shoe member 28. The flashing 12 would typically be a non-corrosive metallic piece that extends only a few inches up from the base shoe member 28 at the lower ends of the wall framing studs 24, and includes a vertically extending flange 30 that is integral with a laterally extending flange 32. The function of the laterally extending flange 32 will hereinafter become apparent. The vertically extending flange 30 is mechanically attached to the base shoe member 28.

The weather-resistive barrier 14 in the disclosed embodiment is standard #15 felt, 60 min. Grade D paper, or equivalent, which has an inner surface 34 and an outer surface 36. The inner surface 34 of the barrier 14 is mechanically affixed, usually with staples or adhesive, to the outer surface 26 of the wall framing studs 24, overlapping the flange 30 of the flashing 12. The barrier 14 performs several functions. It serves as an air barrier over the building envelope, as well as acting to prevent water penetration as a second line of defense behind the cladding.

Referring to FIGS. 1 and 4, in the most preferred embodiment, the water durable board 16 is a cement based panel, preferably a DUROCK® Cement Board, that can undergo prolonged exposure to water (repeated soakings, total immersion) without undergoing a significant loss of structural properties. However, it can be appreciated that the water durable board 16 could also be made of water resistant gypsum, or any other water damage resistant material. The water durable board 16 has an inner surface 38 and an outer surface 40. The inner surface 38 of the water durable board 16 includes a textured pattern 42, illustrated in FIG. 4 as comprising dimples or grooves 44. The purpose of the textured pattern 42 on the water durable board 16 is to create a vertical drainage surface that enhances drainage in the system 10. The dimples 44 as illustrated in FIG. 4 are particularly suited for this purpose because they create a myriad of vertical flow sinuous paths. However, it can be appreciated that other textured patterns or unpatterned, irregular relief formations that create interstitial spaces for the unblocked flow of water downwardly would be equivalents. As shown in FIG. 6, a standard starter track 33 is provided at the base of the water durable board 16: its function known to one of ordinary skill in the art.

Figure 5:
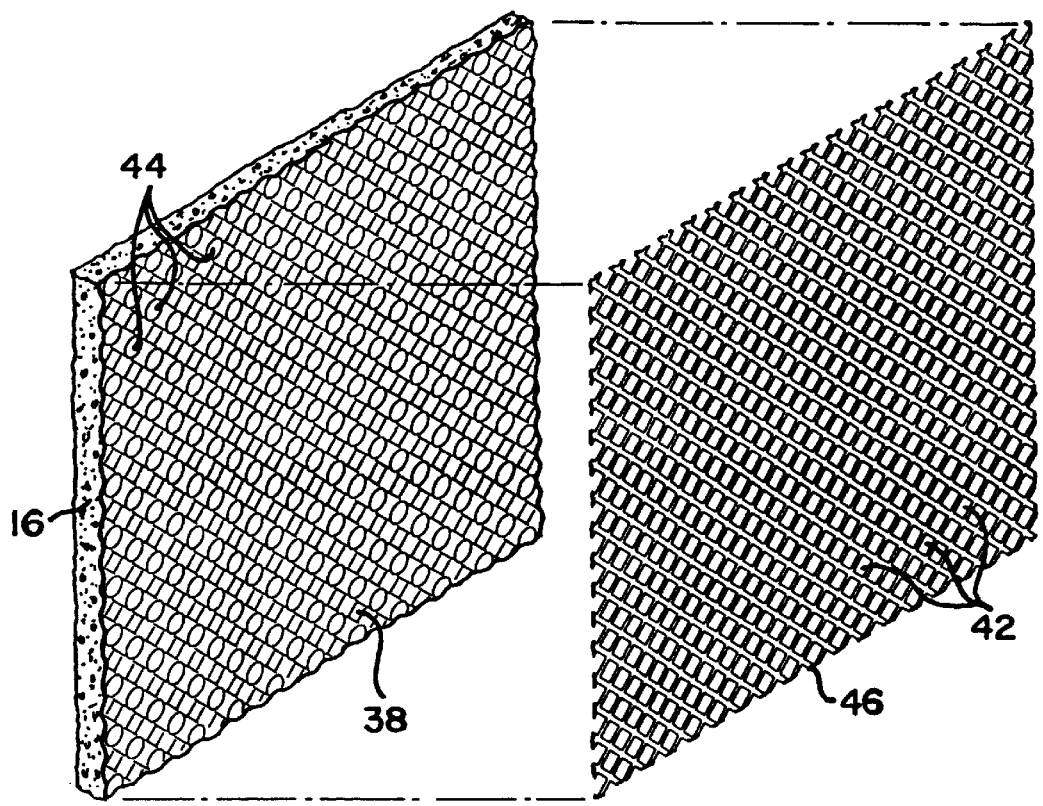
FIG. 5 is an illustration of a method used to create the textured pattern on the water durable board.
Figure 6:
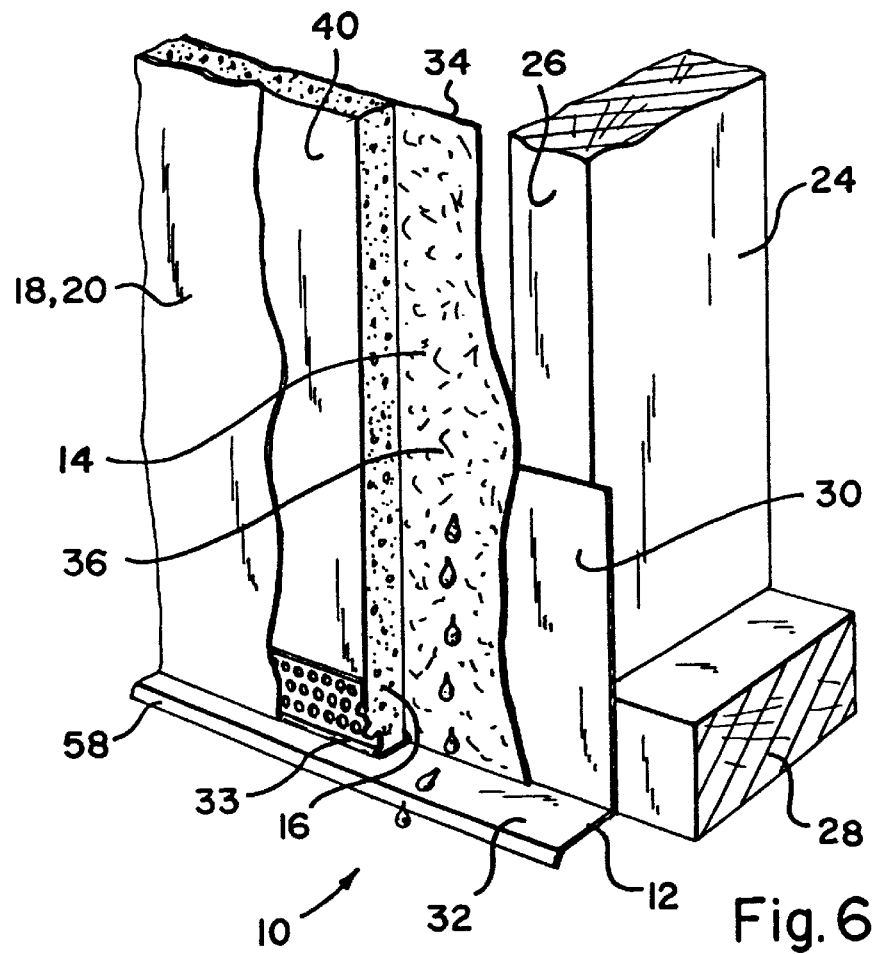

As illustrated in FIG. 5, the preferred method of making the dimples or grooves 44 on the inner surface 38 of the water durable board 16 includes the application of a textured fabric 46, having the textured pattern 42, onto the inner surface 38 of the water durable board 16 as it is made in the conventional conveyor belt in-line forming process (not illustrated). After the cement board slurry has set but not cured, the textured fabric 46 may be stripped from it, leaving the textured pattern 42 on the inner surface 38. In the most preferred method, the diameter of the dimples 44 on the inner surface 38 of the water durable board 16 is approximately 0.125 inches and the space between the dimples 44 is also approximately 0.125 inches. The height of the vertical sinuous flow paths created by the plurality of dimples 44 is approximately 0.0625 inches. A preferred range for the dimple heights, or equivalent texturing, is from about 0.03125 inches to about 0.1250 inches. For a grooved pattern the grooves would be about 0.0625 inches wide and deep, and spaced approximately 2.00 inches on center in either the horizontal, vertical or diagonal directions.

In FIG. 2, the water durable board 16 is mechanically affixed to the wall framing studs 24, with the inner surface 38 of the water durable board 16 adjacent to the outer surface 36 of the weather-resistive barrier 14. This is usually done through the use of screws (not shown) extending through both the water durable board 16 and the weather-resistive barrier 14 into the wall framing studs 24.

A layer of basecoat/adhesive 18 is applied to the outer surface 40 of the water durable board 16 in the standard way known to those skilled in the building industry and allowed to dry. To complete the wall, a textured exterior finish 20, such as USG EXTERIOR Textured Finish, is trowel-applied and floated to the desired look, also as known to one skilled in the art.

A second embodiment of the invention is illustrated in FIG. 3. An underlayment backer board, or structural sheathing 48, having an inner surface 50 and an outer surface 52 is adhered to the wall framing studs 24 by mechanically affixing the inner surface 50 of the sheathing 48 to the outer surfaces 26 of the wall framing studs 24. The flashing 12 (as shown in FIG. 6) and the weather-resistive barrier 14 are then also affixed to the wall framing studs 24 in that order. The structural sheathing 48 is typically plywood, or alternately any other equivalent wood composite board known in the art.

Figure 7:
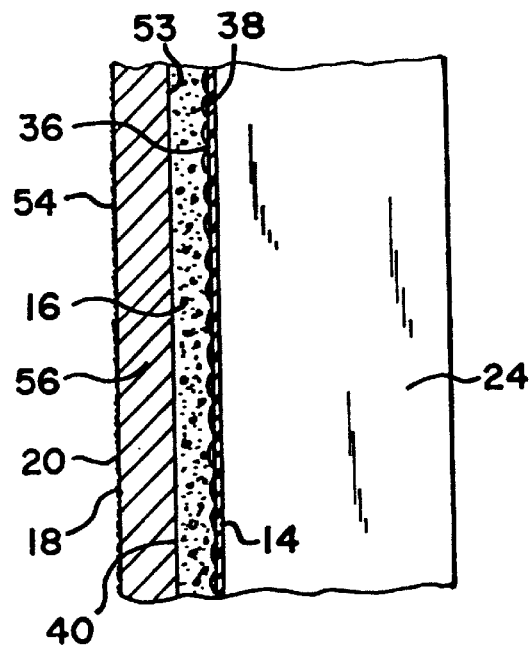
FIG. 7 is a side view similar to FIG. 2 but for an EIFS showing a wall frame member, a weather-resistive barrier, a water durable board, and foam insulation adhesively bonded to the water durable board.
Figure 8:
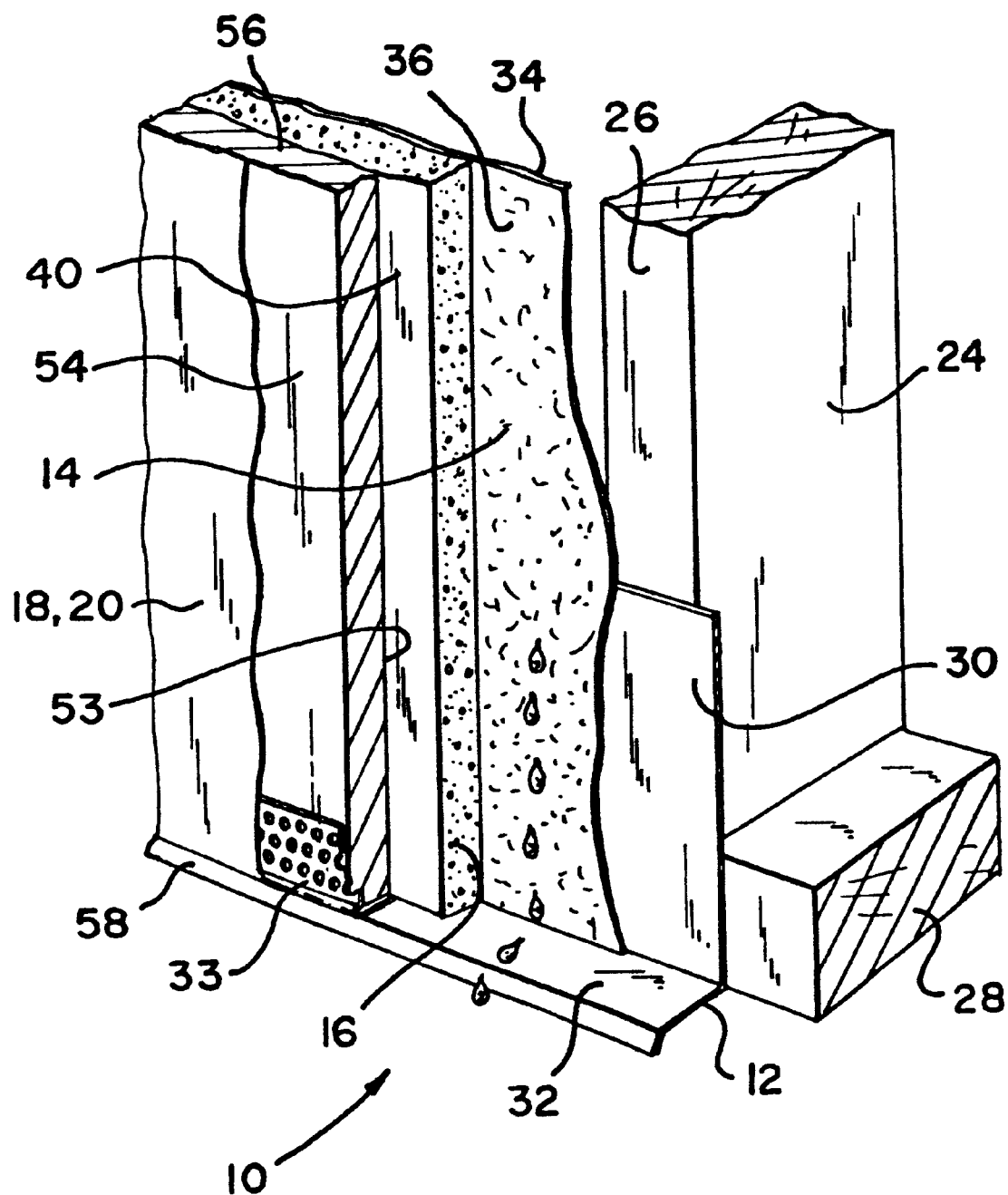

A third embodiment of the invention is for an EIFS is illustrated in FIGS. 7 and 8. The inner surface 53 of an insulation board 56, preferably expanded polystyrene, is preferably adhesively secured onto the outer surface 40 of the water durable board 16. Next, a layer of basecoat/adhesive 18 and reinforcing is applied to the outer surface 54 of the insulation board 56 and allowed to dry.

In a fourth embodiment for an EIFS (not illustrated) a structural sheathing 48 may also be used wherein the inner surface 50 of the structural sheathing 48 is mechanically affixed to the outer surface 26 of the wall framing studs 24, as in FIG. 3. The flashing 12 and the weather-resistive barrier 14 are then also affixed to the wall framing studs 24 in that order. Finally, the inner surface 53 of the insulation board 56 is preferably adhesively secured onto the outer surface 40 the water durable board 16. In both the third and fourth embodiments, the textured finish 20 is trowel-applied to the outer surface 54 of the insulation board 56, and floated to the desired look. Securement of the insulation board 56 may be other than by adhesive, such as stapling, nailing or other mechanical and bonding equivalents.

In operation, the inner surface 38 of the water durable board 16 with the dimple pattern 44 creates a drainage medium between the inner surface 38 of the water durable board 16 and the outer surface 36 of the weather-resistive barrier 14 for managing the water outward of the building structure. This enables water that is present at the interface between the water durable board 16 and the weather-resistive barrier 14 to drain freely through the interstitial spaces created by the dimples 44 on the water durable board 16. This unwanted water usually comes from leakage around doors or windows, by virtue of the sealant around the doors or windows leaking, from cracks in the decorative and protective exterior finish, or from leaks at the top or parapet of the wall. The drained water is caught adjacent the base shoe member 28 of the wall framing studs 24 by the flashing 12, and is further drained outside the wall by the laterally extending flange 32 of the flashing 12 at weep holes, or the like, at the bottom of the cladding. The laterally extending flange 32 is further characterized by a downwardly angled lip 58 that allows the water to drain outward of the building structure.

It will be understood that the texturing of the inner surface of the water durable board 16 is provided to create relief on the surface to form a myriad of random or patterned drainage flow paths for water. It is not limited to a dimpled pattern or grooves. The texturing is preferably formed whereby the water durable board 16 may be placed in any orientation onto the wall framing studs 24 or other support members, i.e., lengthwise, sideways or angled, and still provide the flow paths for drainage.

Various features of the invention have been particularly shown and described in connection with the illustrated embodiments of the invention, however, it must be understood that these particular arrangements do not limit but merely illustrate, and that the invention is to be given its fullest interpretation within the terms of the appended claims.

What is claimed is:

1. An exterior finishing system for a building comprising:
   a weather-resistive barrier having an inner surface and an outer surface;
   a water durable and permeable board with a water vapor permeance from about 6 perms to about 40 perms, having an inner surface and an outer surface, said inner surface having a unitary water drainage texture, said unitary water managing texture disposed adjacent and in contact with said outer surface of said weather-resistive barrier;
   whereby liquid water trapped between said weather-resistive barrier and said water durable and permeable board of said exterior finishing system can be drained therefrom and water vapor trapped between said weather-resistive barrier and said water durable and permeable board of said exterior finishing system can permeate outwardly through said water durable and permeable board.

2. An exterior finishing system in accordance with claim 1 wherein said means for managing water includes texture on said inner surface of said water durable and permeable board, said texture forming a vertical drainage medium.

3. An exterior finishing system in accordance with claim 2 wherein said texture comprises a myriad of sinuous flow paths.

4. An exterior finishing system in accordance with claim 3 wherein said texture includes a plurality of dimples.

5. An exterior finishing system in accordance with claim 3 wherein said texture includes a plurality of grooves.

6. An exterior finishing system in accordance with claim 1 further comprising an insulation board having an inner surface and an outer surface, said inner surface of said insulation board attached to said outer surface of said water durable and permeable board.

7. An exterior finishing system in accordance with claim 6 wherein said outer surface of said insulation board has an exterior finishing material thereon.

8. An exterior finishing system in accordance with claim 1 further comprising a structural sheathing attached to said inner surface of said weather-resistive barrier.

9. An exterior finishing system in accordance with claim 1 wherein said outer surface of said water durable and permeable board has an exterior finishing material thereon.

10. An exterior cladded wall comprising:
    a plurality of studs having outer surfaces and being framed to form a wall;
    a flashing component having a horizontal member and a vertical member, said vertical member affixed exteriorly of said outer surfaces of said studs and said horizontal member extending outwardly from said vertical member;
    a weather-resistive barrier having an inner surface and an outer surface, said inner surface of said weather-resistive barrier being fastened to said outer surfaces of said studs and said vertical member of said flashing component contacting said inner surface of said weather-resistive barrier;
    a water durable and permeable board with a water vapor permeance of from about 6 perms to about 40 perms, having an inner surface and an outer surface, said inner surface of said water durable and permeable board having a unitary water managing texture, said unitary water drainage texture of said water durable and permeable board disposed adjacent and in contact with said outer surface of said weather-resistive barrier.

11. A cladded wall in accordance with claim 10 further comprising an insulation board having an inner surface and an outer surface, said inner surface of said insulation board disposed adjacent said outer surface of said water durable and permeable board.

12. A cladded wall in accordance with claim 11 wherein said outer surface of said insulation board has an exterior finishing material thereon.

13. A cladded wall in accordance with claim 10 wherein said means for managing water comprises a texture on said water durable and permeable board, said texture forming a vertical drainage medium.

14. A cladded wall in accordance with claim 13 wherein said texture includes a plurality of dimples, said dimples forming a myriad of sinuous flow paths.

15. A cladded wall in accordance with claim 13 wherein said texture includes a plurality of grooves, said grooves forming a myriad of sinuous flow paths.

16. A cladded wall in accordance with claim 10 further comprising a structural sheathing having an inner surface and an outer surface, said inner surface of said structural sheathing attached to said outer surface of said studs and said outer surface of said structural sheathing disposed adjacent said inner surface of said weather-resistive barrier.

17. A cladded wall in accordance with claim 10 wherein said outer surface of said water durable and permeable board has an exterior finishing material thereon.

18. A water drainage exterior wall system including a water durable and permeable board comprising:
    a first surface and a second surface;
    a weight of from about 1.5 lbs/sq·ft to about 4.5 lbs/sq·ft;
    a water vapor permeance from about 6 perms to about 40 perms; and,
    said first surface including a unitary dimpled texture, said unitary dimpled texture forming a vertical drainage medium, said second surface providing an exteriorly facing cladding for the exterior wall and adapted to receive an exterior finish thereon.

19. A water durable and permeable board for water management exterior wall system in accordance with claim 18 wherein said texture further comprises a plurality of dimples forming a myriad of sinuous flow paths.

20. A water durable and permeable board for water management exterior wall system in accordance with claim 19 wherein said outer surface of said water durable and permeable board has an exterior finish thereon.

21. A water durable and permeable board for water management exterior wall system in accordance with claim 18 wherein said texture further comprises a plurality of grooves forming a myriad of sinuous flow paths.

22. An exterior finishing system for a building comprising:
- a weather-resistive barrier having a first surface and a second surface;
- a water durable and permeable board with a water vapor permeance from about 6 perms to about 40 perms, having a first surface and a second surface, said first surface of said water durable and permeable board having a unitary water drainage texture; and,
- said unitary water drainage texture being adjacent to and in contact with said second surface of said weather-resistive barrier.

23. An exterior finishing system in accordance with claim 22 further comprising an insulation board having an inner surface and an outer surface, said inner surface of said insulation board being adjacent to said outer surface of said water durable and permeable board.

24. An exterior finishing system in accordance with claim 23 wherein said outer surface of said insulation board has an exterior finishing material thereon.

25. An exterior finishing system in accordance with claim 22 further comprising a structural sheathing attached to said inner surface of said weather-resistive barrier.

26. An exterior finishing system in accordance with claim 22 wherein said outer surface of said water durable and permeable board has an exterior finishing material thereon.

27. An exterior finishing system for a building comprising:
- a weather-resistive barrier having a first surface and a second surface;
- a water durable and permeable board with a weight from about 1.5 lbs/sq·ft to about 4.5 lbs/sq·ft and with a water vapor permeance from about 6 perms to about 40 perms, having a first surface and a second surface, said first surface having a unitary water drainage grooved texture, said unitary water drainage grooved texture disposed adjacent and in contact with said second surface of said weather-resistive barrier;
- whereby liquid water and water vapor trapped between said weather-resistive barrier and said water durable and permeable board can drain liquid water generally vertically and water vapor can permeate through said water durable and permeable board to said second surface of said water durable and permeable board.

* * * * *

UNITED STATES PATENT AND TRADEMARK OFFICE
CERTIFICATE OF CORRECTION

PATENT NO.     : 6,410,118 B1
DATED          : June 25, 2002
INVENTOR(S)    : James Reicherts et al.

It is certified that error appears in the above-identified patent and that said Letters Patent is hereby corrected as shown below:

<u>Title page,</u>
Add in Item [73]: -- United States Gypsum Company, Chicago, IL --

Signed and Sealed this

Fifteenth Day of July, 2003

JAMES E. ROGAN
*Director of the United States Patent and Trademark Office*